April 2, 1940.  J. M. WALTON ET AL  2,195,793
FLUID CLUTCH AND TRANSMISSION
Filed Aug. 14, 1939  5 Sheets-Sheet 1

Inventors
John M. Walton
and John E. Darby
By Wilkinson & Mawhinney
Attorneys.

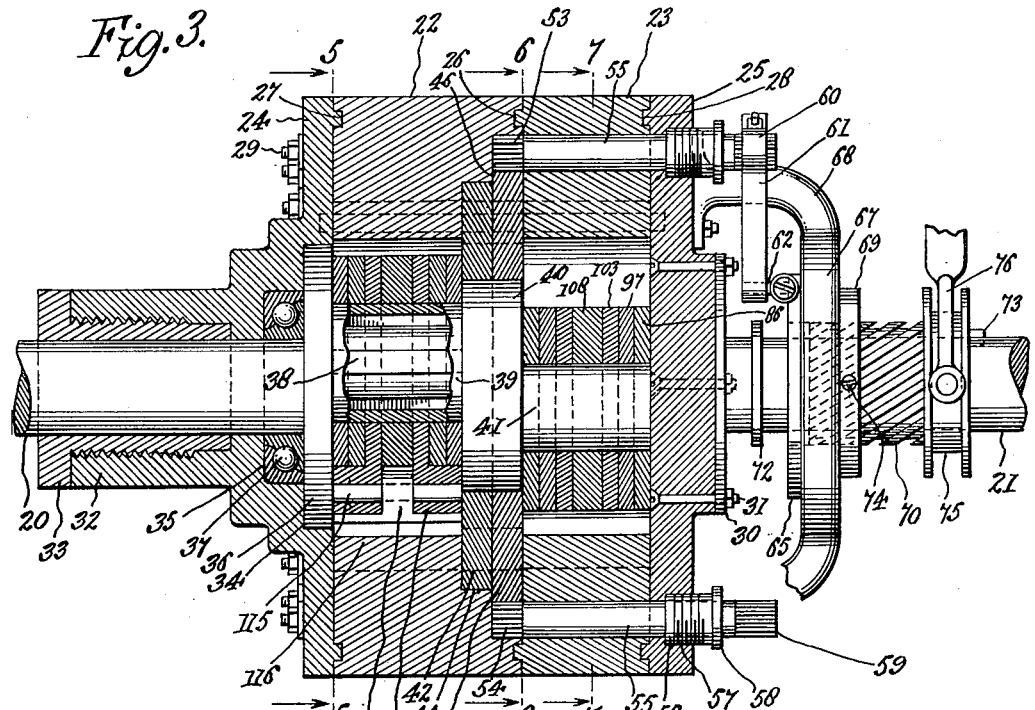

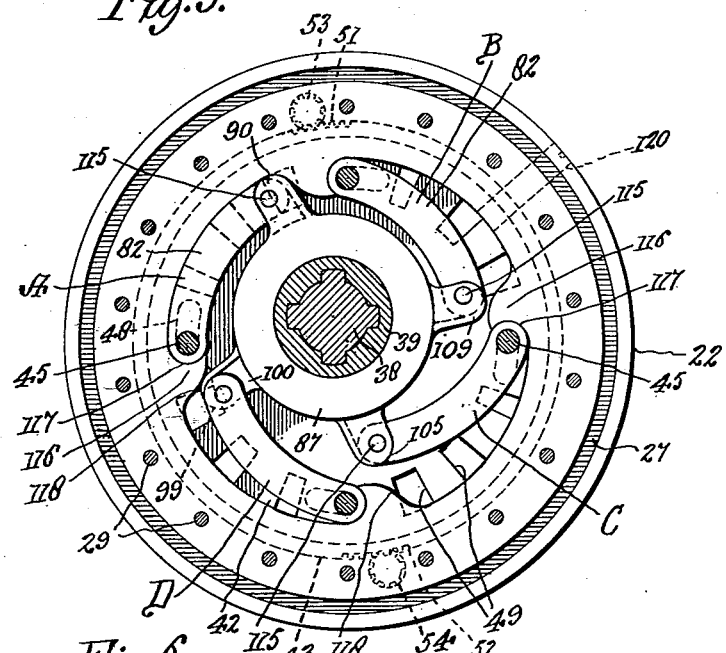
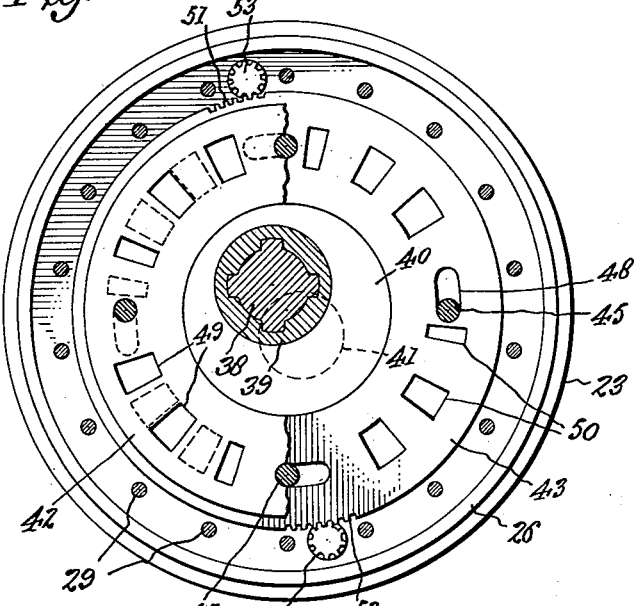

Inventors
John M. Walton
and John E. Darby
By Wilkinson & Mawhinney
Attorneys.

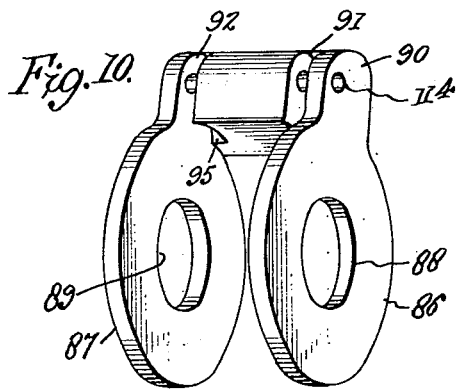
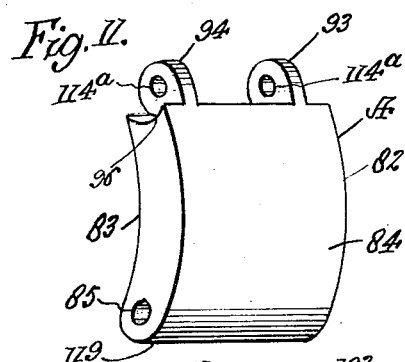
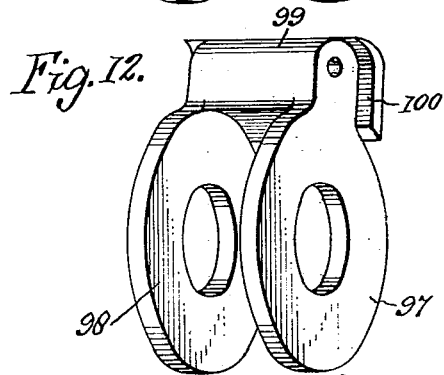
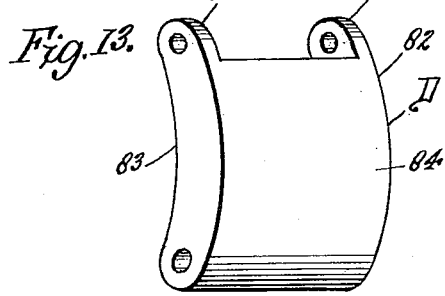
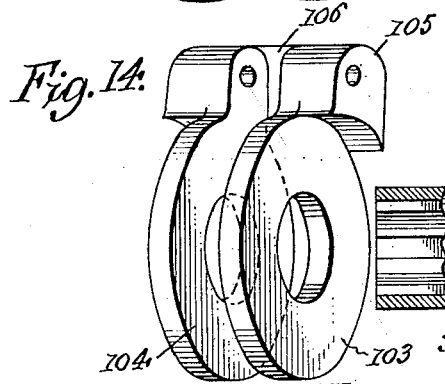
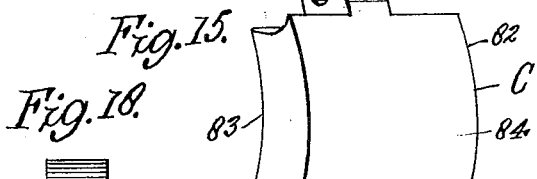
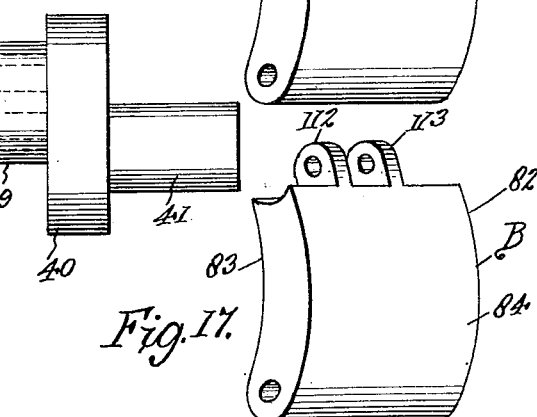
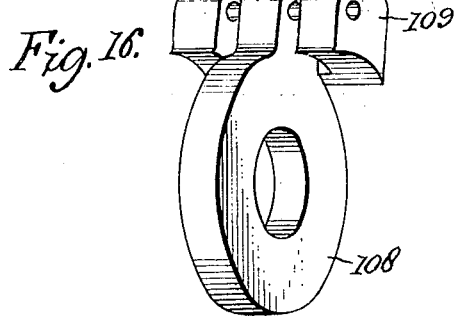
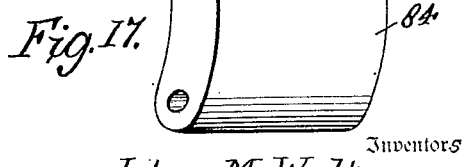

Patented Apr. 2, 1940

2,195,793

UNITED STATES PATENT OFFICE 2,195,793

FLUID CLUTCH AND TRANSMISSION

John M. Walton and John E. Darby, New Orleans, La., assignors of one-half to William J. Leppert, New Orleans, La.

Application August 14, 1939, Serial No. 290,140

14 Claims. (Cl. 192—58)

The present invention relates to improvements in fluid clutches and transmissions, and has for an object to provide a hydraulic or other fluid machine or device which may be substituted in motor vehicles, such as automobiles, trucks, boats, watercraft and the like, for the mechanical clutch and gear transmissions to the end that greater flexibility of operation may be secured in the transfer of the motive power from the driving shaft to its follower or propeller shaft.

The invention is also applicable as a coupling between motors and will be appreciated by those skilled in the art to have a wide variety of uses, in fact in all applications where a differential drive is required between a drive and a driven shaft or between a driver and a follower, or where the motion of the follower is to be entirely suspended while the driver moves, for instance at idling speed.

A further object of the invention resides in so constructing, organizing and arranging the parts of a fluid transmission as to enable the "shifting" of the transmission, by which is meant the adjustment of the hydraulic passages to secure various driving ratios, in a facile manner with quickness and positiveness.

Other objects of the invention reside in the compact construction of a device of this character for assembly into relatively small compass, the relative arrangement of the parts to secure adequate torque and strong driving power, to simplify mechanical constructions and operations and to impart ease in the operation and great flexibility in the result without necessitating any great amount of education on the part of the user of the improved fluid clutch and transmission.

With the foregoing and other objects in view, the invention will be more fully described hereinafter, and will be more particularly pointed out in the claims appended hereto.

In the drawings, wherein like symbols refer to like or corresponding parts throughout the several views—

Figure 3 is a vertical section taken on the line 3—3 in Figure 2.

Figure 4 is a horizontal section taken on the line 4—4 in Figure 2.

Figure 5 is a vertical cross section taken on the line 5—5 in Figure 3.

Figure 6 is a similar section taken on the line 6—6 in Figure 3.

Figure 10 is a perspective view of one of the ring devices.

Figure 11 is a similar view showing the cooperating vane.

Figure 12 is a perspective view showing another of the ring devices.

Figure 13 is a perspective view of its cooperating vane.

Figure 14 is a perspective view of another of the ring devices.

Figure 15 is a similar view illustrating its cooperating vane.

Figure 16 is a perspective view showing still another of the ring devices, and

Figure 17 is a similar view illustrating its cooperating vane, and

Figure 18 is a side elevation, with parts broken away and parts shown in section, of the crank pin assembly.

Figure 1:
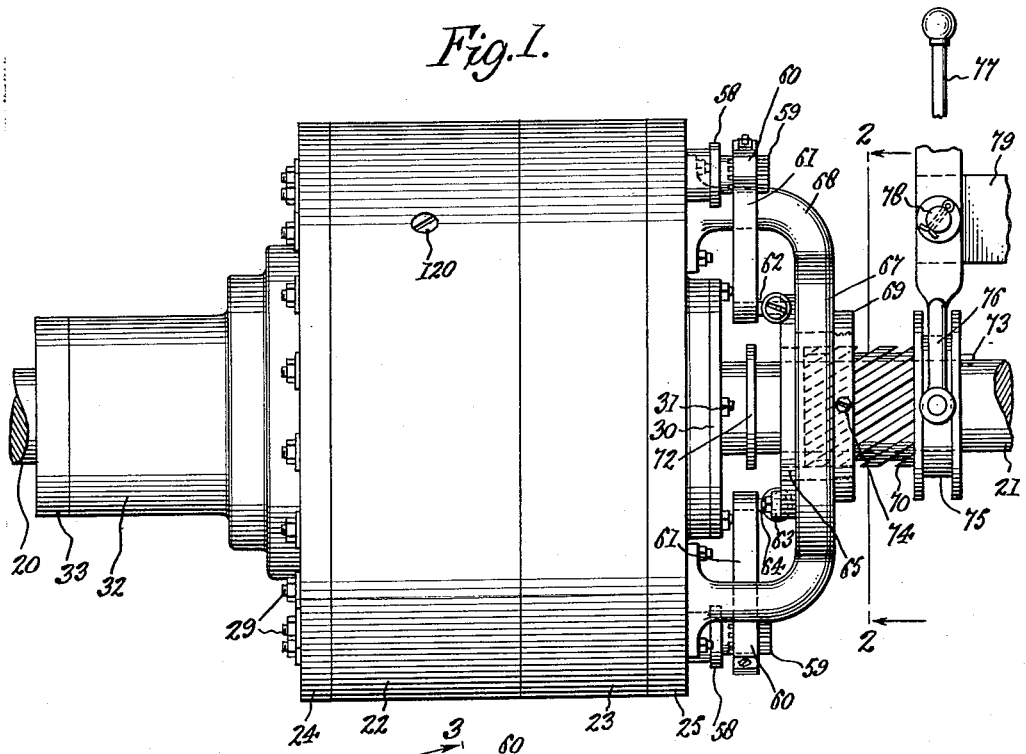
Figure 1 is a top plan view, with parts broken away and parts shown in section of an improved fluid clutch and transmission constructed in accordance with the present invention.

Referring more particularly to the drawings, 20 designates the driving shaft or driver and 21 indicates the driven shaft or follower.

The driver 20 drives the internal rotary member 39, 40, 41, and the follower 21 has fixedly secured thereto the outer casing composed of the two cylinders 22 and 23 and the end heads 24 and 25. To secure and preserve alinement these various parts are formed with mating tongues and grooves 26, 27 and 28. Bolts 29 or other suitable fastening means pass through the heads 24 and 25 and the included cylinders 22 and 23 for the purpose of holding these four parts together to comprise a hollow casing.

The head 25 receives thereagainst an end flange 30 of the follower shaft 21, bolts or other fastenings 31 being employed to bind this end flange 30 to the head 25 whereby the head 25 is fixed to the follower shaft 21. By means of the bolts 29 which bind all of the parts of the casing fixedly to the end head 25, the casing is made fast to the follower shaft 21.

The head 24 carries a sleeve 32 through which the driver 20 extends and relatively turns, such sleeve 32 accommodating packing and forming with the gland 33 a packing or stuffing box for preventing the water, oil or other fluid from escaping from the interior of the casing around the drive shaft 20.

In the end head 24 are formed terraces or steps 34 and 35, the former of which receives the circular disc 36 of the drive shaft 20, and the latter step 35 being provided to hold a ball or other bearing 37 for the drive shaft.

The disc 36 carries a crank pin 38 best seen in Figures 3, 5 and 6. In Figures 5 and 6 this crank pin is shown as splined for the purpose of driving a sleeve 39 eccentrically carried at one side of the disc 40; such disc carrying at its other side a solid crank pin 41 having its axis offset from the center of the disc 40 diametrically opposite to the center of the sleeve 39. The sleeve 39 is at one side of the center of the disc 40 and the crank pin 41 at the other side of the center of the disc 40.

The disc 40 has a bearing and rotates in the valve discs 42 and 43. The valve disc 42 is received in a recess 44 in the cylinder 22 and is non-rotatable, being held against movement by fulcrum pins 45, of which there are four in the embodiment of the invention herein shown, such four pins being shown to advantage in Figures 5 and 6 and being spaced around the circumference of the casing approximately 90° apart.

The rotatable or adjustable valve disc 43 is mounted in a recess 46 of the cylinder 22, the recess 46 being stepped out from the recess 44, the adjustable or rotary valve disc 43 being preferably of slightly greater diameter as compared with its companion stationary valve disc 42.

Figure 8:
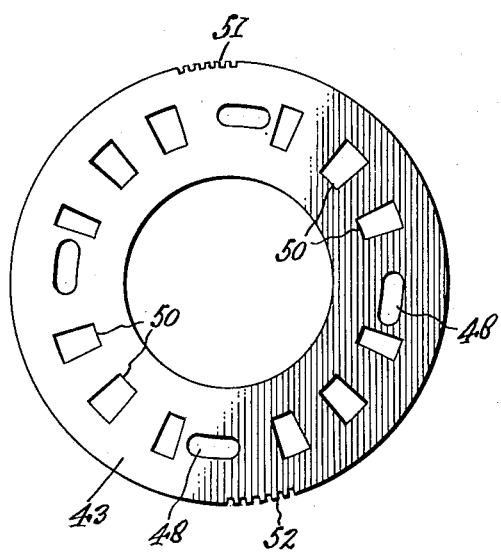
Figure 8 is a plan view of the movable valve disc.
Figure 9:
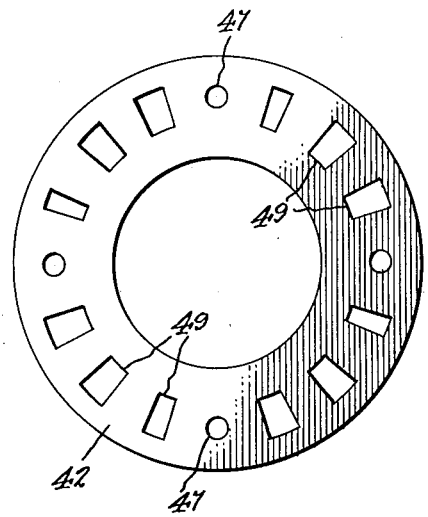
Figure 9 is a similar view of the stationary valve disc.

These two valve discs are shown in Figures 8 and 9. Figure 9 shows the stationary valve disc 42 having the round holes or other openings 47 to receive the fulcrum pins 45.

The adjustable valve disc 43, shown in Figure 8, has arcuate slots 48 which receive the fulcrum pins 45 whereby the adjustable disc 43 may rotate within limits, at the same time being guided by the fulcrum pins 45 as well as by the companion stationary disc 42 against which the rotary disc 43 engages as illustrated in Figures 3, 4 and 6.

The fixed disc 42 is formed with ports 49 adapted to register with ports 50 of the adjustable disc 43. These ports 49 and 50 are separated by circumferential blank spaces so that by rotating the disc 43 to one position, for instance that shown in Figure 6, where the fulcrum pins 45 engage against certain end walls of the slots 48 the ports 49 and 50 are completely out of registry so that there is no communication of fluid from the internal chamber within cylinder 22 to the internal chamber within cylinder 23. These valve discs 42 and 43 are interposed between these two chambers and either cut off or regulate the rate of flow of the fluid from one chamber to the other.

Returning to Figure 6, when the adjustable disc 43 is rotated to a position where the other end walls of the elongated slots 48 engage the fulcrum pins 45, the ports 49 and 50 will be in complete registry thus allowing for the maximum port area between the two chambers. Thus the fulcrum pins 45 subserve an additional function in limiting the rotary throw of the adjustable valve disc 43 and in enabling the operator, who is denied a view of the interior of the apparatus, a means of feeling the position of adjustment of the rotary valve disc 43.

As shown in Figure 8, the rotary valve disc 43 is provided with one or more toothed segments 51 and 52 for engaging pinions 53 and 54.

Such pinions are carried upon shafts 55 having collars 56 for fitting removably into sockets 57 in the end head 25, which sockets open upon the exterior face of the end head 25. The sockets may be internally threaded to receive nuts 58 by which the collars 56 and shafts 55 are removably held in place. At the outer ends, the shafts 55 may be knurled, as indicated at 59 to receive thereover the clamps 60 shown more particularly in Figure 2. Such clamps are carried by arms 61 connected as at 62 to other arms 63 pivoted as indicated at 64 upon a disc 65 shown more particularly in Figures 1, 3 and 4.

Such disc 65 is carried by a drum 66 rotatably mounted within a circular bearing 67 held by the arms 68 rigidly to the end head 25. The drum 66 may be screw threaded to receive a nut 69 whereby the drum 66 and its flange 65 is removably yet rotatably held within the bearing 67.

Within the drum 66 freely rotates and axially slides a worm sleeve 70. As best seen in Figure 4, this worm sleeve moves axially along a key 71 on the follower shaft 21 whereby the worm sleeve 70 is compelled by key 71 to rotate with follower shaft 21 but said worm sleeve 70 may be adjusted axially along the follower shaft 21 within the limits provided by a flange 72 and a stop 73 both carried by the follower shaft 21.

The worm sleeve 70 may be traversed by one or more spiral grooves running in an axial direction, the number being dependent upon the number of pins 74 carried by the drum 66 and extending into such grooves of the drum 70. These pins 74 may also extend through the nut 69 if desired as indicated in Figure 4, for the additional purpose of preventing casual rotation of the nut 69 which might result in the nut accidentally backing off the threads of the sleeve 66 during the operation of the device. In its outer end the sleeve carries a grooved drum 75 to receive the shifting fork 76 of the gear shift lever 77 having its fulcrum point as indicated at 78 in Figure 1 upon a part of the framework 79 of the vehicle or machine upon which the clutch and transmission is mounted.

As shown in Figure 4 the fulcrum pins 45 having their ends received in the sockets 80 and 81 formed respectively in the end heads 24 and 25.

As shown in Figure 5 these pins 45 form fulcrum points about which the vanes 82 swing. In the embodiment of the drawings four such vanes are shown in Figure 5 which is a cross section through the chamber housed within cylinder 22. There are four other vanes 82ª, these vanes being shown in Figure 7, which is a section taken through the other chamber which is housed within the cylinder 23.

As shown in Figure 5, the ports 49 and 50 of the two valve discs are so located radially that they lie opposite the spaces between the outer curved portions of the vanes 82 and the inner included arc portions of the interiors of the cylinders 22 and 23.

The formation of the vanes is shown more particularly in Figures 11, 13, 15 and 17. In all of these figures the vanes are shown as substantially solid, wide and elongated blocks of metal or other appropriate material having substantially concentric inner and outer walls 83 and 84 and being pierced at one end by openings 85 to be tightly received by the fulcrum pins 45. In these features all of the four vanes in each chamber are substantially alike.

However the vanes differ somewhat in their constructions by which they are pivoted to central ring devices. All of these ring devices fit about the crank sleeve 39 as shown in Figures 3 and 4.

The ring device for the vane shown in Figure 11 is illustrated in Figure 10 and comprises two rings 86 and 87 having the openings 88 and 89 to snugly yet rotatively fit upon the crank sleeve 39.

It will be apparent that the rings 86 and 87 are spaced apart, they being held in this position by a lug 90 outstanding from the circular edges of the rings 86 and 87 and preferably being integral with the metal or other material of said rings and bridging the gap between the spaced rings. This lug 86 is formed with slots 91 and 92 adjoining the planes of the discs to receive therein the lugs 93 and 94 respectively shown in Figure 11 as projecting out from the trailing edge of the vane 82. The outer edges of lugs 93 and 94 are curved to conform to the curvature of walls 95 of the lug 90 against which they snugly bear when the lugs 93 and 94 are interfitted in the slots 91 and 92. Moreover the vanes 82 are formed with incurved free end portions 96 to rotatively and snugly fit upon the external similarly curved walls of the lug 90.

In Figure 5, the ring device shown in Figure 10 is identified by its lug numbered 90.

Referring more particularly to Figure 12, the ring device includes perforated rings 97 and 98 also fitted rotatably about the crank sleeve 39. These discs are spaced apart and carried by a lug 99. The lug 99 holds the rings 97 and 98 apart but at a less distance apart than the rings 86 and 87 of Figure 10 whereby the rings 97 and 98 of the ring device shown in Figure 12 can be fitted between the rings 86 and 87 as shown in Figure 10.

Flanges 100 project from lug 99 to receive the lugs 101 and 102 on the vane 82 which is shown in Figure 13.

Referring to Figure 5 the ring device and its connected vane is identified by the lug numbered 99 in this Figure 5. It is apparent that the lug 99 is removed circumferentially from the lug 90 by an angular distance of approximately 90°.

Referring now to Figure 14, a third ring device includes the two rings 103 and 104, connected by lug 105 formed with slot 106 to receive the central lug 107 of the vane shown in Figure 15. The rings 103 and 104 of Figure 14 are spaced apart sufficiently to fit snugly within the rings 97 and 98 of Figure 12. Rings 103 and 104 rotate upon crank sleeve 39.

Looking at Figure 5, the lug 105 is shown as being angularly spaced a distance of substantially 90° from the lug 99.

Referring more particularly to Figures 16 and 17, in Figure 16 is shown a ring device composed of a single ring 108 adapted to snugly and rotatably fit between the rings 103 and 104 of Figure 14.

A lug 109 carried by the ring 108 is formed with slots 110 and 111 to receive the two lugs 112 and 113 on the vane shown in Figure 17.

In Figure 5 the lug 109 is shown as disposed at approximately 90° from the lugs 90 and 105.

Figures 3 and 4 show how the various rings of the several ring devices nest together and fit upon the crank sleeve 39.

All of the various lugs, both of the ring devices and of the vanes, are perforated in registry as indicated at 114 and 114a to receive therethrough the pivot pins 115. These pivot pins 115, as shown in Figure 3, abut against the discs 36 and 40 in the chamber of cylinder 22; and against disc 40 and end head 25 in the chamber of cylinder 23. The pivot pins are not as long as the fulcrum pins 45 which extend in common across both chambers. The pivot pin 115 are separate pins for each chamber.

As shown in Figure 5, four such pivot pins 115 are shown to agree with the four vanes and four lugs of the ring devices.

Figure 7:
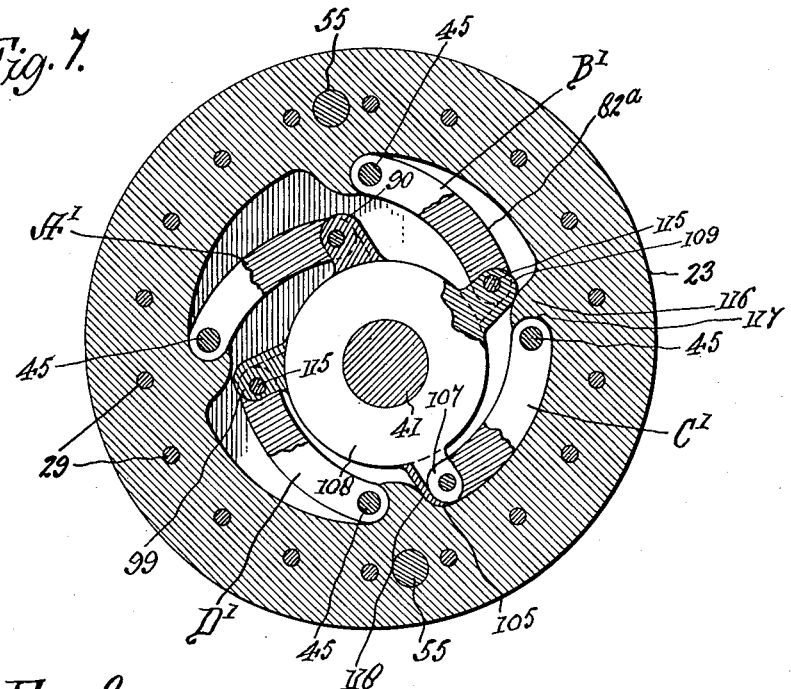
Figure 7 is also a vertical cross section taken on the line 7—7 in Figure 3.

In both Figures 5 and 7, the cylinders 22 and 23 are shown as formed with internally projecting abutments 116 which are four in number to agree with the four vanes used in this particular embodiment of the invention. At one side the abutments are formed with concave faces 117 and at the other side with convex faces 118. The concave faces 117 receive convexly curved end parts 119 of the vanes in order to form a fluid tight fit at this point. The convex faces 118 are adapted to receive thereagainst the similarly curved edges of the lugs of both the ring devices and the vanes and these convex surfaces 118 will conform snugly to the curvilinear path taken by the lugs when moving radially inward and outward. Compare the positions of these parts in Figure 5.

It will be understood also that the lugs of the various vanes have a fluid tight fit in the slots of the lugs of their respective ring devices to avoid the leakage of fluid past the pivotal connections.

Also the side edges of the vanes will have a fluid tight fit, thus in the chamber encompassed by the cylinder 22 fitting against the disc 36 and against both the disc 40 and the valve disc 42; while the side edges of the vanes in the companion chamber housed within the cylinder 23 will have a fluid tight fit against the end head 25 at one side and the disc 40 and adjustable valve plate 43 at their other sides. A fluid tight fit will occur about both the fulcrum pins 45 and the pivot pins 115 and about the side edges of the vanes whereby fluid trapped upon the outer convex walls 84 of the vanes will not be able to escape when the free edges of the vanes move into conjunction with the convex walls 118 of the abutments 116.

For convenience in description of the operation the four vanes of Figure 5 are represented in positions A, B, C and D. It will be remembered that Figure 5 shows the chamber housed within the cylinder 22.

In Figure 7, which shows the other chamber housed within the cylinder 23, the corresponding vane positions are indicated at A', B', C' and D'.

Alongside of Figures 11, 13, 15 and 17 are also marked A, B, C and D to identify the vanes and their connected ring devices in respect to their positions in the assembled device as shown in Figure 5.

It will be understood that a separate crank assembly involving sleeve 39, disc 40 and crank pin 41 are material only for assembly purposes in that it would be inconvenient to have all of these cranks cast in one with the drive shaft 20.

Also the casing is composed of separable parts for convenience in assembly in receiving the interior parts including the vanes, their ring devices the valve discs and the crank pin assembly.

Fluid may be filled into the device through any appropriate filling connection 120 shown in Figures 1 and 5. All spaces between vanes and housing and vanes and ring devices should be entirely filled with fluid with the ports 49 and 50 of the valve plates registering wide open.

In operation the drive shaft 21 is rotated by a motor or engine (not shown) to which it is connected. The fluid which is displaced by any outward moving vane passes through the ports in the valve discs and is transferred to the opposite chamber to the space being formed by the companion inwardly moving vane. For instance compare Figures 5 and 7. Vane A of Figure 5 has just been moved to its outermost position, while vane A' in the companion chamber across the valve discs is now in its farthest inward position. The space created by the inwardly moving vane A' has received the fluid expelled by the outward movement of the vane A of Figure 5. When a vane of one chamber moves out, the opposite vane of the other chamber moves in whereby the fluid may be transferred freely from one chamber to the other when the ports in the valve discs are open or partly open whereby no power is transferred from the driver to the follower.

In other words the driver may rotate its crank pin 38 together with the crank sleeve 39 and crank pin 41 around within the casing without imparting any rotary movement to the casing or to the follower shaft 21. The rotation of the cranks will only have the effect to shift the vanes radially in and out, the cranks, in so doing, rotating freely in an eccentric manner around within the cylinders 22 and 23.

Figure 2:
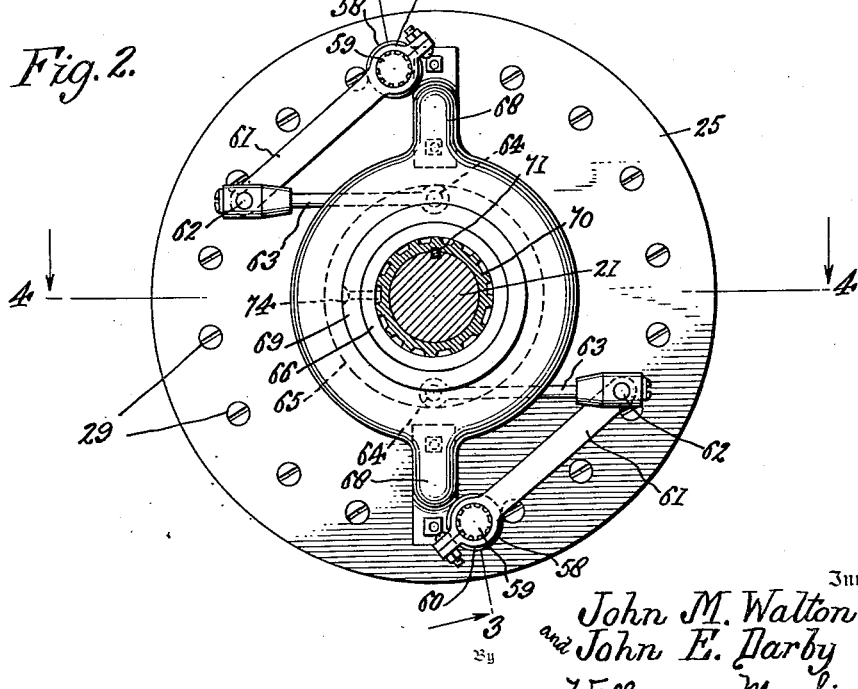
Figure 2 is a transverse section taken on the line 2—2 in Figure 1.

When it is desired to rotate the follower shaft 21 at the same rate of speed as the drive shaft 20, namely, direct drive, or at some lesser speed, the rotary valve disc 43 is adjusted angularly to partially or fully close the ports 49 and 50. This is accomplished by shifting gear lever 77 which accordingly shifts the drum 75 and with it the worm sleeve 70 axially along follower shaft 21. In so doing the spiral grooves of the worm sleeve 70 will react upon the pins 74 causing a rotation of drum 66 and its disc 65 to which the arms 63 are connected as shown in Figure 2. The rotary movement of the disc 65 will communicate a movement to arms 63 and a corresponding movement to the coupled arms 61 and the shafts 55 which carry the pinions 54.

Such pinions, being in mesh with the segments 51 and 52 of the rotary valve disc 43, will shift that disc angularly to the degree corresponding with the throw of the gear shift lever 77.

When the valve ports 49 and 50 are partly closed, if the motor is turning slowly with the port area thus restricted, there is still no force exerted on the driven portion of the device. If the motor is speeded up, the reduced port openings do not allow quick enough passage of fluid from one chamber or unit to the other, and a tendency to turn the entire device is then exerted. The amount of this tendency is dependent upon the acceleration of the driving motor or engine and the degree of closure of the ports.

As an illustration:

The motor or engine may be turning the drive shaft 20 with its crank throws at 1750 R. P. M., and the desired speed of the driven machine is 500 R. P. M. In this case it is only necessary to bring the valve closed to a point where 500 R. P. M. of the driven machine is arrived at.

In the same manner any speed of the driven machine may be had from one to one (when the ports are entirely closed) to one hundred to one (when the ports are partially open). By varying the stroke of the crank pins, various torques may be obtained and various pressure may be exerted. The shorter the stroke, the greater the leverage and pressure exerted and with a relatively smaller amount of fluid.

Comparing Figures 5 and 7, as has been heretofore stated, when the vane is in the outer position A in one chamber the vane A' in the companion chamber is in the innermost radial position. The diametrically opposite vane C' in Figure 7 is however in the outermost position while the companion vane C of Figure 5 is in the innermost position.

Whereas the vane B of Figure 5 is moving out, the vane B' of Figure 7 is moving in.

Vane D of Figure 5 is moving in while vane D' of Figure 7 is moving out.

With the fluid trapped against the outer convex faces of the vanes, the outward movement of the vanes is prevented or retarded and consequently the cranks cannot rotate within the housing but must carry the housings and the follower shaft around with the same.

From the foregoing it is believed clear that the invention provides an improved hydraulic device with which any desired speed may be had up to the speed of the driving motor or engine.

The two crank throws 39 and 41, being 180° apart and operating two vane and ring assemblies produces a balanced unit thereby.

The abutments or bosses 116 not only subserve the functions heretofore ascribed to them but also act as reinforcements for the housing and they receive also the direct thrust of the vanes in the driving connection between the two parts.

It is obvious that various changes and modifications may be made in the details of construction and design of the above specifically described embodiment of this invention without departing from the spirit thereof, such changes and modifications being restricted only by the scope of the following claims:

What is claimed is:

1. In a fluid clutch and transmission, relatively offset cranks connected to a driver, a casing extending about the cranks connected to a follower and having separate fluid chambers therein, adjustable valve means interposed between said chambers, and fluid moving devices associated with said cranks in said chambers, said devices comprising movable vanes coupled to said cranks, corresponding vanes in one chamber being disposed opposite to the respective vanes in the other chamber and adapted to alternately discharge fluid against and receive fluid from such corresponding vanes, and means in the chambers for trapping the fluid against said vanes.

2. In a fluid transmission and clutch, a driver including relatively offset cranks, a follower including a casing extending about said cranks and forming separate chambers, one about each crank, adjustable valve means between said chambers, means for adjusting the port area of said valve means, and fluid moving devices, one device being mounted in each chamber and associated with the crank therein and comprising movable vanes coupled to said casing and to the cranks, and means for trapping fluid against the outside operative faces of said vanes during the outward movement thereof.

3. In a fluid transmission and clutch, a driver including relatively offset cranks, a follower including a casing extending about said cranks, adjustable valve means in and carried by said casing and dividing said casing into two separate chambers, one of said cranks being in each chamber, means for varying the port area of said valve means, and oscillating vanes in said chambers coupled to the casing and to the cranks and having outer fluid impelling faces.

4. In a fluid transmission and clutch, a driver including relatively offset cranks, a follower including a casing extending about said cranks, valve means dividing said casing into two chambers, one crank being situated in each chamber, means for adjusting the port area of the valve means, vanes pivoted to the casing in both said chambers, and ring devices on the cranks pivotally coupled to the other ends of said vanes.

5. In a fluid transmission and clutch, a pair of relatively offset cranks, means to drive said cranks, a follower including a casing extending about said cranks, adjustable valve means forming a partition in said casing and dividing the casing into separate chambers, one crank being located in each chamber, ring devices mounted on said cranks, vanes pivoted at one end to said ring devices, and means for pivotally coupling the other ends of the vanes to said casing.

6. In a fluid transmission and clutch, a driver including relatively offset cranks, a follower including a casing extending about said cranks, adjustable valve means in the casing dividing the casing into adjoining chambers, means for selectively adjusting the port area of said valve means, vanes pivoted to said casing in both the chambers, and ring devices rotatably fitted upon said cranks and having lugs pivoted to the free floating ends of said vanes.

7. In a fluid transmission and clutch, a driver including relatively offset cranks, a follower including a casing extending about said cranks, adjustable valve means in the casing dividing the casing into adjoining chambers, means for selectively adjusting the port area of said valve means, vanes pivoted to said casing in both the chambers, ring devices rotatably fitted upon said cranks and having lugs pivoted to the free floating ends of said vanes, and abutments extending inwardly from said casing in said chambers for receiving thereagainst the opposite end portions of said vanes.

8. In a fluid transmission and clutch, a pair of relatively offset cranks, means to drive the same, a follower casing extending about said cranks, adjustable valve means dividing said casing into chambers, one crank being located in each chamber, ring devices rotatably mounted about said cranks in both chambers, said ring devices composed of interfitting rings having independent relative movement on said cranks, and perforated lugs carried by said rings, vanes having perforated lugs and incurved adjacent edges for snugly mating with the lugs on said ring devices and being pivoted thereto, means for pivoting the other ends of the vanes to said casing, and means in said casing to trap fluid against the outer faces of said vanes.

9. A fluid transmission and clutch comprising a driver including relatively offset cranks, a follower including a casing extending about said cranks, adjustable valve means partitioning said casing into adjacent chambers, one crank being located in each chamber, abutments extending into the chambers from said casing, said abutments having relatively opposed concave and convex surfaces, vanes having curved ends snugly turning in said concave surfaces, the other trailing ends of said vanes being free to move in and out radially, means for pivotally connecting said trailing ends to the cranks, said trailing ends and said means having curved surfaces for snugly fitting against the convex surfaces of said abutments.

10. In a fluid transmission and clutch, driver and follower members, a casing connected to one member, fixed and adjustable valve plates dividing said casing into adjoining chambers, said plates having valve ports therein, means to rotate said adjustable valve plate including rotary members in driving engagement with said adjustable valve plate, arms coupled to said rotary members, a rotary disc coupled to said arms, and means to rotate said disc in both directions.

11. In a fluid transmission and clutch, driver and follower members, a casing connected to one member, fixed and adjustable valve plates dividing said casing into adjoining chambers, said plates having valve ports therein, means to rotate said adjustable valve plate including rotary members in driving engagement with said adjustable valve plate, arms coupled to said rotary members, a worm sleeve mounted to rotate with said follower and to slide axially of the follower, a connection between said disc and worm sleeve for rotating the disc on axial sliding movement of the sleeve, and a transmission shifting means coupled to axially shift said sleeve.

12. In a fluid transmission and clutch, drive and driven members, a casing coupled to one member, adjustable valve discs dividing said casing into companion chambers controlled by said valve discs, all fluid impelling vanes in both said chambers both connected to said drive member, said fluid impelling vanes being positioned with respect to said adjustable valve discs whereby when said valve discs are in open position the fluid impelling vanes will act to force the fluid from one chamber through said valve discs to the other chamber, and means whereby said fluid impelling vanes of the two chambers simultaneously act in opposite directions whereby when fluid is being impelled from one chamber to the other the fluid impelling vanes in the last chamber are moving to create space to receive such fluid.

13. In a fluid transmission and clutch, drive and driven members, a casing connected to one member, adjustable valve means for dividing said casing into companion chambers, fluid impelling vanes in both of said chambers, means connecting said fluid impelling vanes to the driver in such way as to cause the fluid impelling vanes in one chamber to act relatively opposite to that in the other chamber whereby when fluid is being impelled from one chamber by its vane into the other chamber the fluid impelling vane in the latter chamber will be moving to create space to receive such fluid.

14. In a fluid transmission and clutch, drive and driven members, a casing connected to one member, adjustable valve discs for dividing said casing into adjoining chambers, a fluid impelling vane mounted in each member and connected to the other member, means between said impelling vanes and member to cause the fluid impelling vanes of both chambers to move back and forth but with the fluid impelling vane in one chamber moving alternately to the fluid impelling vane of the companion chamber, and means for relatively adjusting said valve discs to govern the port area.

JOHN M. WALTON.
JOHN E. DARBY.